United States Patent
Saito et al.

(10) Patent No.: US 6,428,448 B2
(45) Date of Patent: Aug. 6, 2002

(54) CONSTANT-SPEED RUNNING CONTROLLER FOR VEHICLE

(75) Inventors: Yoshiharu Saito; Kazuyuki Konno; Norio Nakauchi; Takamichi Shimada, all of Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 45 days.

(21) Appl. No.: 09/731,711

(22) Filed: Dec. 8, 2000

(30) Foreign Application Priority Data

Feb. 23, 2000 (JP) .......................................... 2000-046483

(51) Int. Cl.[7] ............................................. B60R 41/04
(52) U.S. Cl. ........................... 477/111; 477/106; 701/53
(58) Field of Search ................................. 477/111, 106, 477/902, 905, 109; 701/51, 53; 123/337

(56) References Cited

U.S. PATENT DOCUMENTS 4,750,598 A * 6/1988 Danno et al. .................. 192/58
5,492,095 A * 2/1996 Hara et al. ............... 123/339.19
5,876,301 A * 3/1999 Tabata et al. ................. 477/109
5,964,202 A * 10/1999 Takagi et al. ............. 123/339.1
6,182,635 B1 * 2/2001 Nishida .......................... 123/399

* cited by examiner

Primary Examiner—Dirk Wright
Assistant Examiner—Tisha D. Lewis
(74) Attorney, Agent, or Firm—Arent Fox Kintner Plotkin & Kahn, PLLC

(57) ABSTRACT

A constant-speed running controller which sets a target throttle opening of a throttle valve such that the speed of a vehicle is at a target vehicle speed, detects an amount of accelerator pedal operation as an accelerating pedal opening, adds the set target throttle opening and the detected accelerating pedal opening to generate an opening signal as the addition result, and drives the throttle valve and controls a transmission stage of an automatic transmission in accordance with the opening signal.

3 Claims, 9 Drawing Sheets

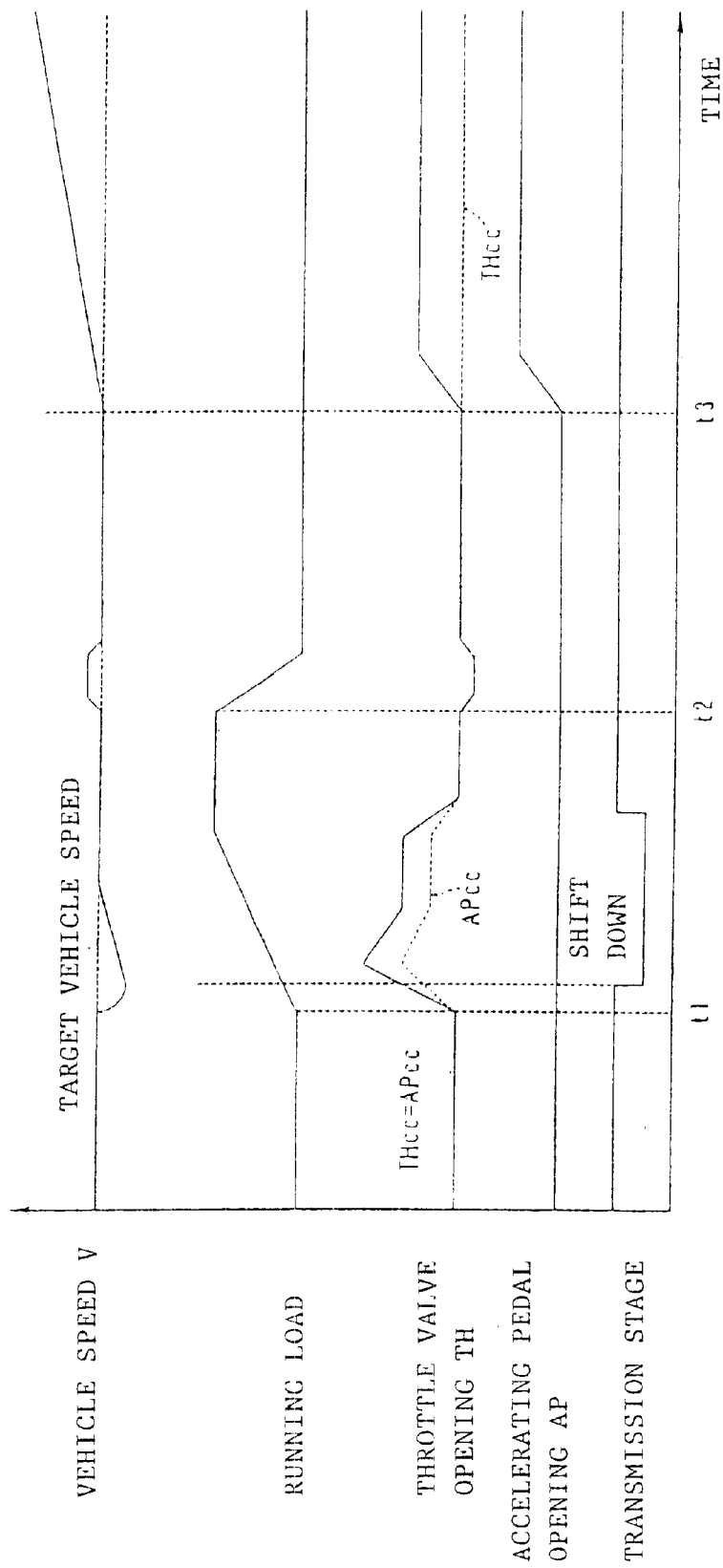

CONSTANT-SPEED RUNNING CONTROLLER FOR VEHICLE

BACKGROUND OF THE INVENTION

1. Field of the Invention

The present invention relates to a constant-speed running controller for vehicle equipped with an engine.

2. Description of the Related Art

Recently, it has become known to provide a vehicle equipped with an electronic throttle controller referred to as DBW (drive by wire) for electrically controlling the opening of a throttle valve without mechanically associating the opening of the throttle valve with an accelerator pedal operation. In the electronic throttle controller, a target opening is set for the throttle valve based on vehicle driving conditions, such as the amount of accelerator pedal operation, and the throttle valve is electrically controlled through an actuator to provide the target opening.

A vehicle equipped with the electronic throttle controller has the throttle opening characteristic stored as a data table indicative of a throttle opening for the amount of accelerator pedal operation. Also, the throttle opening characteristics are provided individually for respective operating conditions such as an acceleration to select a throttle opening characteristic in accordance with actually detected operating conditions for use in controlling the throttle.

When a vehicle equipped with such an electronic throttle controller has a constant-speed running controller for operating the vehicle at a constant speed, the throttle valve opening is controlled in accordance with a change in running load such as a slope to maintain the constant-speed running or operation even if the accelerator pedal is not actuated during the constant-speed running control. Also, when the driver's intention for acceleration is detected from actuation of accelerator pedal during the constant-speed running control, a temporary transition to an accelerating operation is made.

As the control for constant-speed running, it is known that there are apparatuses which employ a method of controlling the opening of a throttle valve in accordance with the vehicle speed or a method of controlling the transmission stage (including a lock-up clutch) of an automatic transmission together with the opening of a throttle valve. Also, Laid-open Japanese Patent Application No. 10-306871 discloses a constant-speed running controller which calculates a pseudo-acceleration opening in accordance with a difference between an actual vehicle speed and a target speed to control the opening of a throttle valve in accordance with the pseudo-acceleration opening in a constant-speed running mode.

FIG. 1 shows an example of changes in vehicle speed, running load, throttle valve opening, amount of accelerator pedal operation, and transmission stage of an automatic transmission in the constant-speed running mode, when using a constant-speed running controller for controlling the throttle valve opening in accordance with the vehicle speed. In FIG. 1, when the running load increases due to a slope in a constant-speed running mode, the vehicle speed decreases from a target speed (broken line), and the throttle valve opening is controlled to increase from a target opening. This causes the speed to increase back to the target speed. Conversely, when the running load decreases, the vehicle speed increases from the target speed, and the throttle valve opening is controlled to decrease from the target opening in response thereto. This causes the speed to decrease back to the target speed. The transmission stage of the automatic transmission is maintained, for example, at a fourth speed. When the accelerator pedal is depressed by the driver for acceleration at a time T in the constant-speed running mode, if the amount of accelerator pedal depression (accelerating pedal opening) exceeds the target opening of the throttle valve opening, the throttle valve opening is controlled to increase from the target opening in response to the operation of the accelerator pedal before proceeding to an accelerating operation.

However, in the conventional constant-speed running controller, since the actual opening of the throttle valve does not change until the accelerating pedal operation exceeds the target opening of the throttle valve opening even if the accelerator pedal is depressed by the driver for acceleration at the time T in the constant-speed running mode, a so-called dead zone occurs, resulting in a problem that good drivability is not provided.

FIG. 2 shows an example of changes in vehicle speed, running load, throttle valve opening, amount of accelerator pedal operation, and transmission stage of an automatic transmission in the constant-speed running mode, when using a constant-speed running controller for controlling the transmission stage of an automatic transmission together with the throttle valve opening. In FIG. 2, when the running load increases due to a slope in the constant-speed running mode, the vehicle speed decreases from a target speed (broken line), and the throttle valve opening is controlled to increase from a target opening in response thereto. The automatic transmission is also shifted down due to the increased throttle valve opening. This causes the speed to increase back to the target speed. Conversely, when the running load decreases, the running speed increases from the target speed, the throttle valve opening is controlled to decrease from the target opening in response thereto, and the automatic transmission is shifted up due to the decreased throttle valve opening. This causes the speed to decrease back to the target speed. When the accelerator pedal is operated by the driver for acceleration at a time T in the constant-speed running mode, the throttle valve opening is immediately controlled to increase from the target opening during the constant speed running in accordance with the amount of accelerator pedal operation to proceed to an accelerating operation.

The constant-speed running controller shown in FIG. 2 can immediately proceed to the accelerating operation even if the accelerator pedal is operated for acceleration in the constant-speed running mode. However, since the target opening of the throttle valve is set higher than a throttle valve opening corresponding to the degree of accelerator pedal operation of zero, the transmission stage of the automatic transmission shifts down to cause shift hunting from a fourth speed to a second speed as shown in FIG. 2. Otherwise, the lock-up of the automatic transmission turns off in an unexpected situation, causing another problem of vehicle shock.

FIG. 3 shows an example of changes in vehicle speed, running load during a constant-speed running mode period (in a period in which a cruise switch is on), throttle valve opening, accelerator pedal operation, pseudo-throttle valve opening, and transmission stage of an automatic transmission when using a constant-speed running controller shown in the above-mentioned Laid-open Japanese Patent Application No. 10-306871.

Since the constant speed running controller calculates a pseudo-acceleration opening in accordance with a difference between an actual vehicle speed and a target speed to control the throttle valve opening in accordance with the pseudo-acceleration opening in the constant-speed running mode, as described above, there is a problem that the throttle valve opening is discontinuous immediately after starting or ending the constant-speed running mode so as to cause an unexpected shift-up or shift-down of the automatic transmission. There is also another problem that since the throttle valve opening is eventually controlled in accordance with the difference in vehicle speed, even if the running load increases due to a slope in the constant-speed running mode, the automatic transmission has a delayed downshift, causing the vehicle speed to substantially decrease from the target vehicle speed.

SUMMARY OF THE INVENTION

It is therefore an object of the present invention to provide a constant-speed running controller for a vehicle which is capable of improving the follow-up characteristic to a target vehicle speed and the drivability for operation of the accelerator pedal in a constant-speed running mode.

A constant-speed running controller of the present invention is a constant-speed running controller for a vehicle-equipped with an engine, comprising an automatic transmission disposed in a driving power transmission system from the engine to wheels, having a plurality of transmission stages; throttle valve opening setting means for setting a target throttle opening of a throttle valve such that the speed of the vehicle is at a target vehicle speed; accelerating pedal opening detecting means for detecting an amount or degree of accelerator pedal operation as an accelerating pedal opening; adding means for adding the target throttle opening set by the throttle valve opening setting means and the accelerating pedal opening detected by the accelerating pedal opening detecting means to generate an opening signal as an addition result; throttle valve driving means for driving the throttle valve based on the output opening signal of the adding means; and transmission stage control means for controlling the transmission stage of the automatic transmission in accordance with the output opening signal of the adding means.

According to the constant-speed running controller of the present invention in the foregoing configuration, even if the vehicle speed decreases or increases from a target vehicle speed due to a change in running load in the constant-speed running mode, a target throttle opening set by the throttle valve opening setting means in response to the change is supplied to the throttle valve driving means and to the transmission stage control means as an opening signal of the adding means, the throttle valve opening and the transmission stage of the automatic transmission are adjusted to immediately return to the target vehicle speed. Also, since an accelerating pedal opening detected by the accelerating pedal opening detecting means is added to the target throttle opening set by the throttle valve opening setting means in response to an operation on the accelerator pedal by the driver in the constant-speed running mode, and an opening signal as the addition result is supplied to the throttle valve driving means, the throttle valve opening can be increased to immediately accelerate the vehicle.

BRIEF DESCRIPTION OF THE DRAWINGS

FIG. 9 shows an exemplary operation of the constant-speed running controller in FIG. 4.

DETAILED DESCRIPTION OF THE PREFERRED EMBODIMENT

An embodiment of the present invention will hereinafter be described in detail with reference to the drawings.

Figure 1:
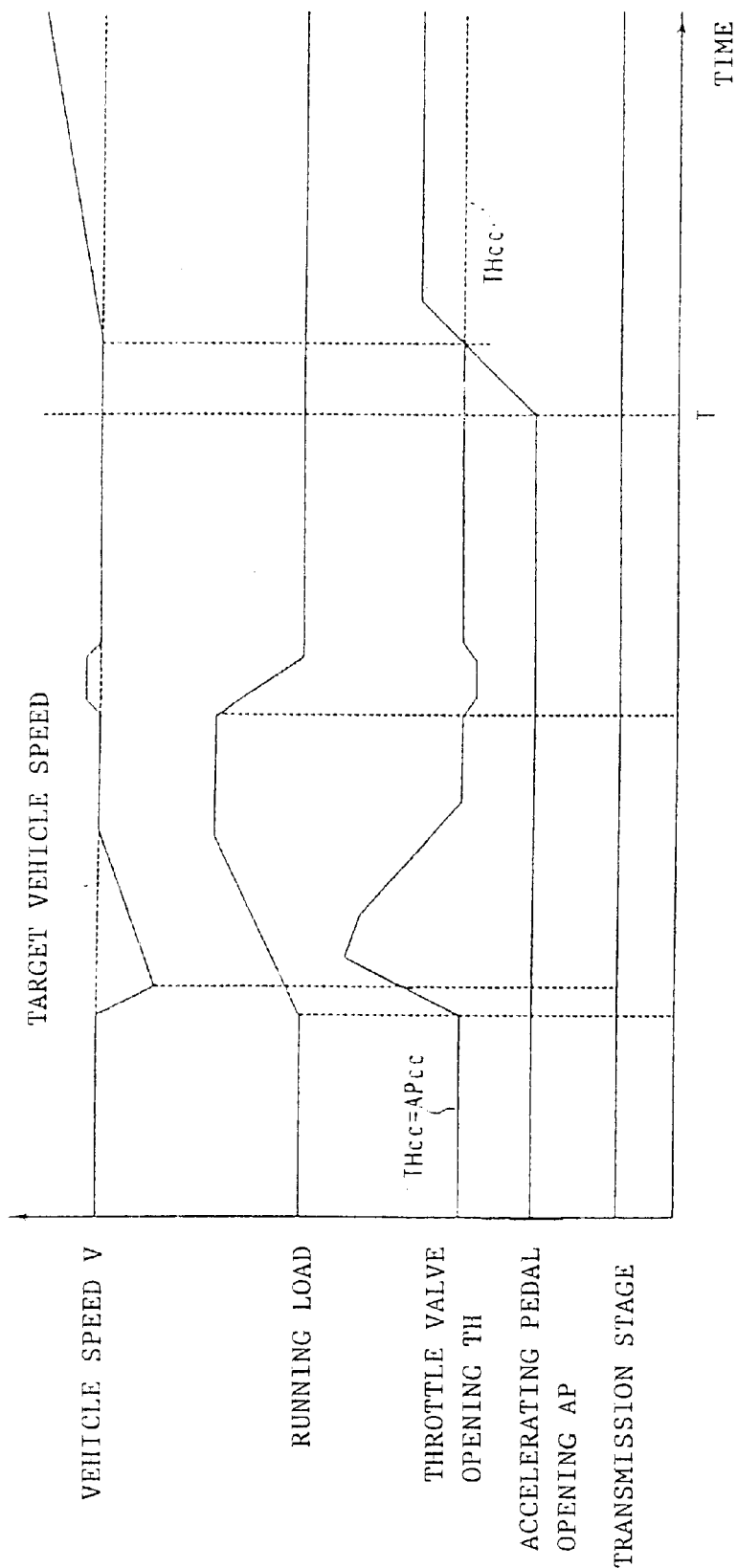
FIG. 1 shows an exemplary operation of a conventional constant-speed running controller.
Figure 2:
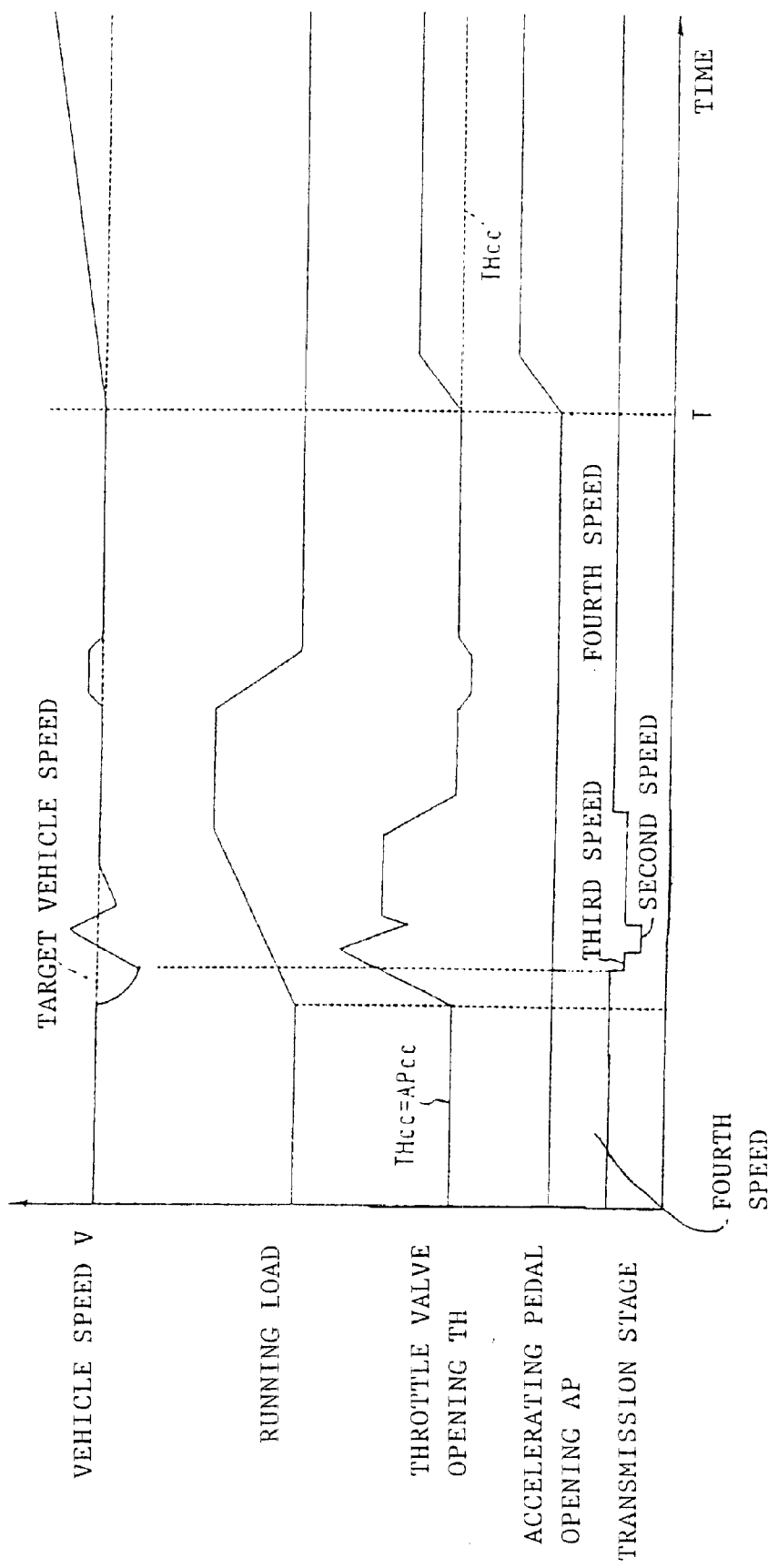
FIG. 2 shows an exemplary operation of a conventional constant-speed running controller.
Figure 3:
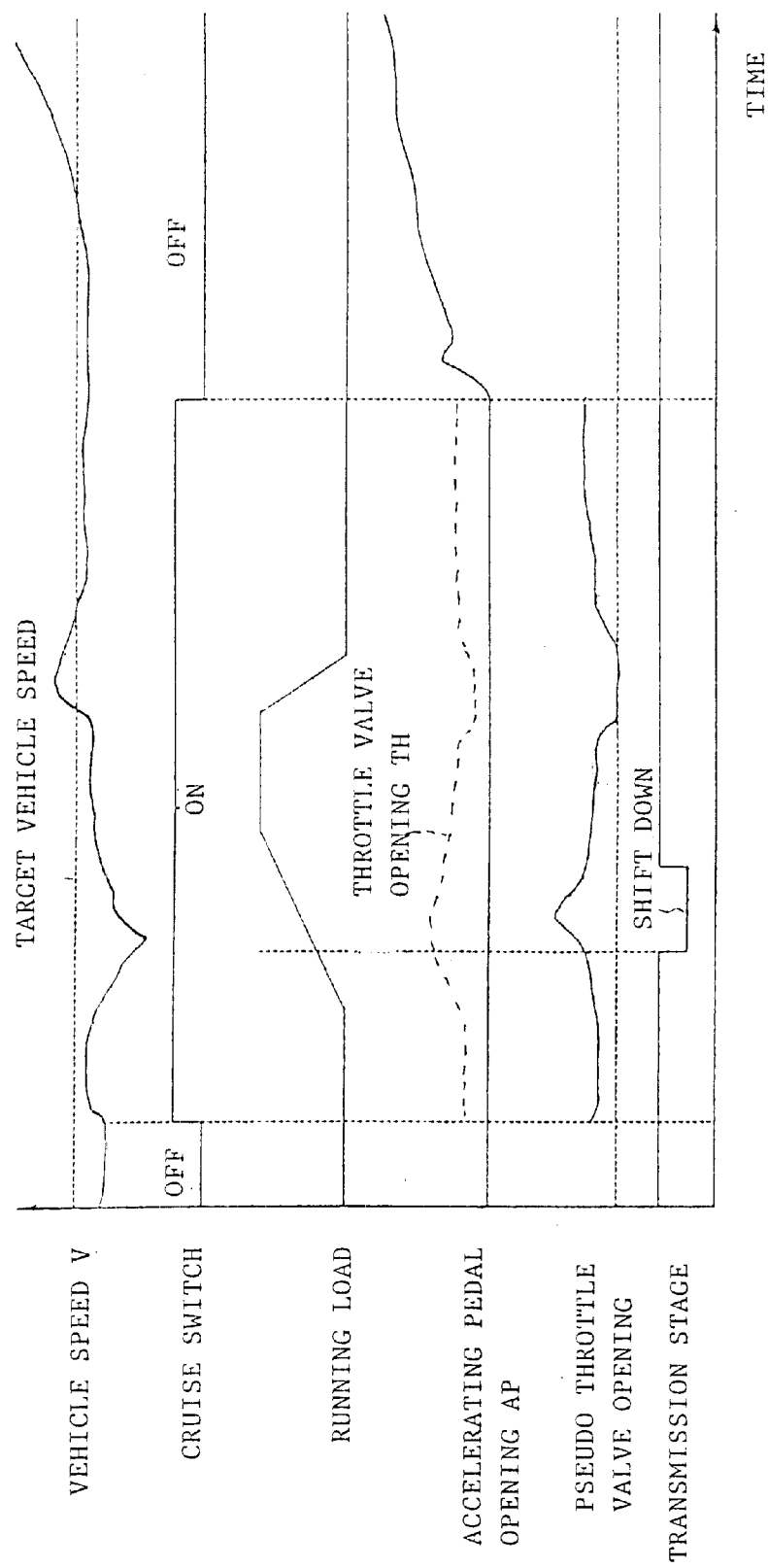
FIG. 3 shows an exemplary operation of a conventional constant-speed running controller.
Figure 4:
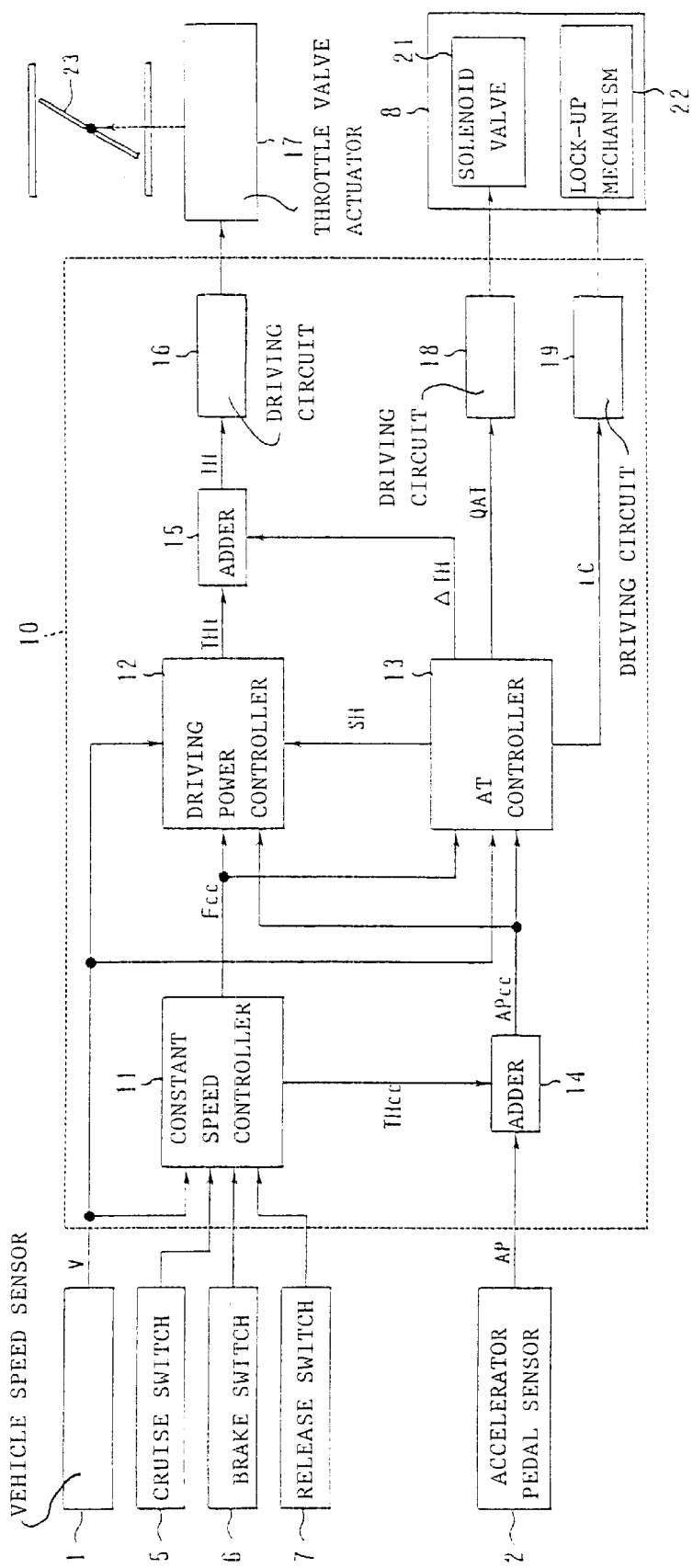
FIG. 4 is a block diagram illustrating a constant-speed running controller according to the present invention.

FIG. 4 illustrates a constant-speed running controller for a vehicle according to the present invention. The controller detects a vehicle speed V and an accelerating pedal opening (amount or degree of accelerator pedal operation) AP as vehicle operating parameters. The vehicle speed V is detected by a vehicle speed sensor 1. The vehicle speed sensor 1 generates an output signal at a level in accordance with the vehicle speed V. An accelerator pedal sensor 2 comprises a potentiometer which generates a voltage associated with an accelerator pedal (not shown).

An engine control unit 10 is connected to outputs of the respective vehicle speed sensor 1 and accelerator pedal sensor 2.

The engine control unit 10, as illustrated in FIG. 4, comprises a constant-speed controller 11 for constant-speed running control; a driving power controller 12 for driving power control; and an AT controller 13 for controlling a transmission stage of an automatic transmission 8. The automatic transmission 8 is disposed in a driving power transmission system from an engine to wheels of the vehicle, and has a lock-up mechanism 22.

The constant-speed controller 11 is connected to a cruise switch 5, a brake switch 6 and a release switch 7, in addition to the vehicle-speed sensor 1. The cruise switch 5 is a switch manipulated by the driver for starting constant-speed running. The brake switch is a switch which is turned on in response to an operation of a brake pedal. The constant-speed controller 11, upon detecting turn-on of the cruise switch 5, starts the constant-speed running control by setting a target throttle valve opening THcc so as to maintain the vehicle speed V at that time, provided from the vehicle speed sensor 1, which outputs the speed as data, and terminates the constant-speed running control upon detecting turn-on of the brake switch 6. Also, the constant-speed controller 11 outputs a constant-speed running flag Fcc indicating whether or not the constant-speed control is executed. The constant-speed running flag Fcc is "1" during the constant-speed running control and "0" during non-constant-speed running control.

An adder 14 is connected to the output of the target throttle valve opening THcc of the constant-speed controller 11. The adder 14 adds the target throttle valve opening THcc and an accelerating pedal opening AP output from the accelerator pedal sensor 2 to output the addition result as an accelerating pedal opening APcc. The driving power controller 12 is connected to an output of the adder 14.

The driving power controller 12 is connected to the vehicle speed sensor 1 and an output of the constant-speed running flag Fcc of the constant-speed controller 11, in addition to the adder 14. The driving power controller 12 is also supplied with a transmission stage signal SH, later described, output from the AT controller 13. The driving power controller 12 comprises a normal AP-TH data map group and a constant-running AP-TH data map for each transmission stage of the automatic transmission. As described later, an AP-TH data map is selected at least in accordance with the transmission stage signal SH during the non-constant-speed running control and during the constant-speed running control, and the selected AP-TH data map is used to search for and set a throttle valve opening THt corresponding to the accelerating pedal opening APcc.

An adder 15 is connected to an output of the driving power controller 12. The adder 15 adds the throttle valve opening THt output from the driving power controller 12 and a throttle valve correction amount ΔTH output from the AT controller 13, and supplies the addition result to a driving circuit 16 as a throttle valve opening TH. The driving circuit 16 drives a throttle valve 23 through a throttle valve actuator 17 such that an actual opening of the throttle valve 23 is equal to the throttle valve opening TH. The throttle valve 23 is of a DBW type which is disposed in an engine intake pipe or manifold.

The AT controller 13 is connected to the output of the adder 14 together with an output of the vehicle speed sensor 1. The AT controller 13 sets the transmission stage in accordance with the vehicle speed V detected by the vehicle speed sensor 1 and the accelerating pedal opening APcc from the adder 14. A shift map stored in an internal memory (not shown) is used in the transmission stage setting. The set transmission stage is supplied to the driving power controller 12 as a transmission stage signal SH. Also, a linear control signal QAT, the throttle valve correction amount ΔTH and a lock-up clutch control signal LC are generated in accordance with the set transmission stage. The linear control signal QAT is a control signal of the solenoid valve 21 which hydraulically changes the transmission stage of the automatic transmission 8. The throttle valve correction amount ΔTH is for correcting the throttle valve opening in order to reduce transmission shift shock. The lock-up clutch control signal LC is data for controlling a lock-up mechanism 22 of the automatic transmission.

The driving circuit 18 is connected to an output of the linear control signal QAT of the AT controller 13. The driving circuit 18 drives the solenoid valve 21 in accordance with the linear control signal QAT to provide a transmission stage of the automatic transmission 8 in accordance with an excitation state of the solenoid valve 21.

A driving circuit 19 is connected to an output of the lock-up clutch control signal LC of the AT controller 13. The driving circuit 19 drives the lock-up mechanism 22 of the automatic transmission 8 in accordance with the lock-up clutch control signal LC to control coupling between an input and an output of a torque converter of the automatic transmission 8.

Next, the operation of the constant-speed running controller in such a configuration will be described with reference to a flow chart.

Figure 5:
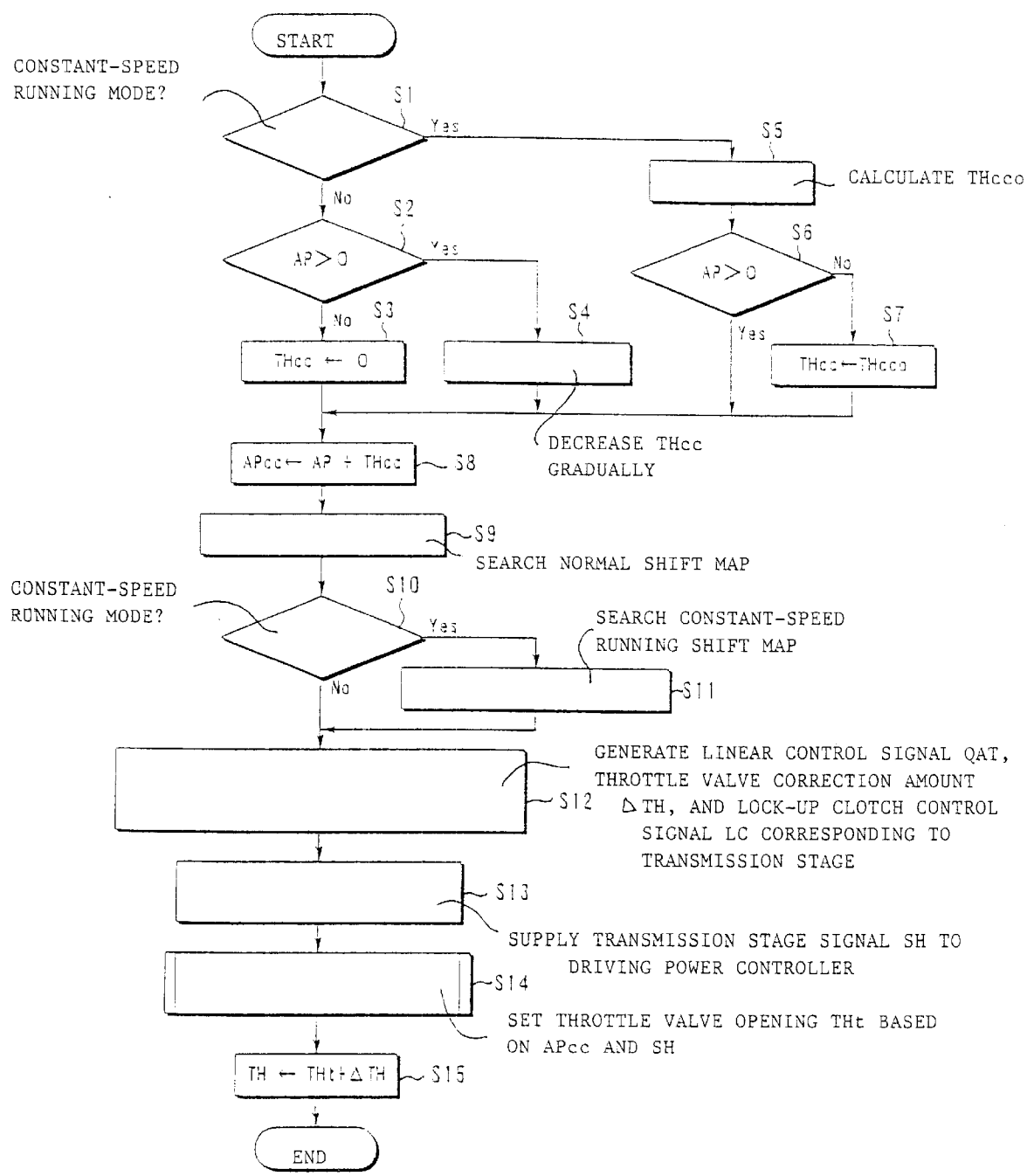
FIG. 5 is a flow chart illustrating the operation of the controller in FIG. 4.
Figure 6:
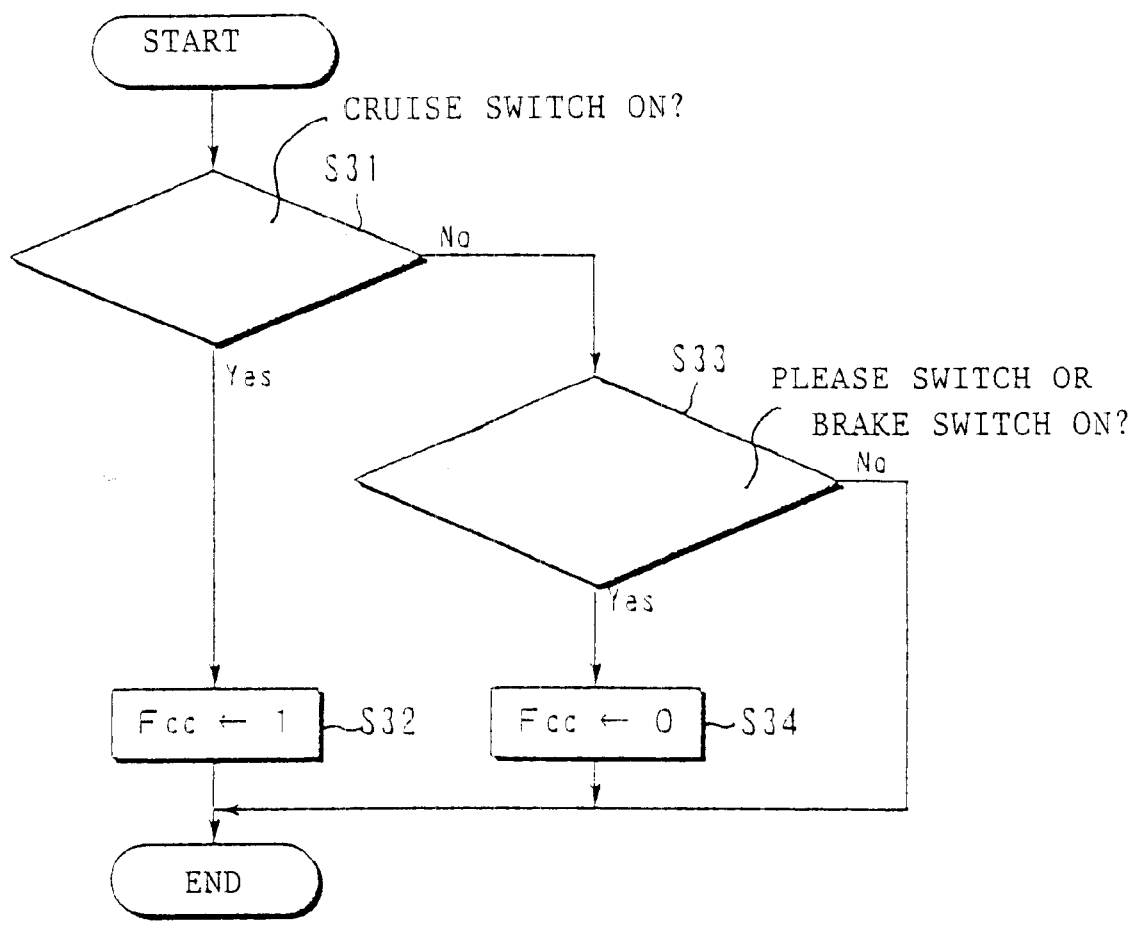
FIG. 6 is a flow chart illustrating a constant-speed running mode determination routine.

As illustrated in FIG. 5, in the engine control unit 10, it is determined whether or not the constant-speed controller 11 is in the constant-speed running mode (step S1). The determination is performed from the contents of the constant-speed running flag Fcc. The constant speed running flag Fcc is set to "1" or "0", for example, as shown in FIG. 6. Specifically, it is determined whether or not the cruise switch 5 is switched on (step S31). If the cruise switch 5 is switched on, this means that the driver has instructed a transition to the constant-speed running mode, so that the constant-speed running flag Fcc is made equal to "1" indicative of the constant-speed running mode (step S32). If the cruise switch 5 is off, it is determined whether or not the brake switch 6 or the release switch 7 is turned on (step S33). When neither the brake switch 6 nor the release switch 7 are on, the constant-speed running mode is continued. On the other hand, if it is determined that the brake switch 6 or the release switch 7 is turned on, the constant-speed running flag Fcc is made equal to "0" in order to terminate the constant-speed running mode (step S34).

When the constant-speed running mode is not determined, i.e., when Fcc=1, it is determined whether or not the accelerating pedal opening AP detected by the accelerator pedal sensor 2 is larger than zero (step S2). If AP=0, the accelerator pedal is not actuated, so that the target throttle valve opening THcc is set to "0" (step S3). If AP>0, the accelerator pedal has been actuated, so that the current target throttle valve opening THcc is gradually decreased (step S4). This is an operation for gradually reducing the target throttle valve opening THcc set in the constant-speed running mode for several seconds immediately after the end of the constant-speed running mode.

When it is determined at step S1 that the constant-speed controller 11 is in the constant-speed running mode, an initial value THcco of the target throttle valve opening THcc is set to maintain the vehicle speed V at a constant speed (step S5). Here, the constant speed is a vehicle speed derived from the vehicle speed sensor 1 at the time the cruise switch 5 is switched on or a predetermined speed.

After executing step S5, the constant-speed controller 11 determines whether or not the accelerating pedal opening AP detected by the accelerator pedal sensor 2 is larger than zero (step S6). If AP=0, the accelerator pedal is not operated or depressed, so that the initial throttle valve opening THcco at step S5 is set as the current target throttle valve opening THcc (step S7). On the other hand, if AP>0, the target throttle valve opening THcc set at step S5 is maintained, followed by proceeding to the next step S8.

The constant speed controller 11 also executes step S8 immediately after it executes step S3, S4 or S7. At step S8, the adder 14 is forced to add the accelerating pedal opening AP and the target throttle valve opening THcc to output the addition result to the driving power controller 12 and the AT controller 13 as the accelerating pedal opening APcc.

The AT controller 13 searches a normal shift map to set a transmission stage (step S9). It is determined whether or not the constant speed controller 11 is in the constant-speed running mode (step S10). At the step S9, the determination is performed from the contents of the constant-speed running flag Fcc in a manner similar to step S1. In the constant-speed running mode, a constant-speed running shift map is searched for setting a transmission stage (step S11).

The normal shift map and the constant-speed running shift map have been previously and separately formed in a memory (not shown) in the AT controller 13, and include transmission stages corresponding to the accelerating pedal opening APcc and the vehicle speed V as data. The constant-speed shift map has such a characteristic that reduces the number of times of shift-up and shift-down as compared with the normal shift map.

When the AT controller 13 sets a transmission stage as mentioned above, it generates the linear control signal QAT, the throttle valve correction amount ΔTH and the lock-up clutch control signal LC for the transmission 8 corresponding to the transmission stage (step S12). The linear control signal QAT is supplied to the driving circuit 18, and the driving circuit 18 drives the solenoid valve 21 in accordance with the linear control signal QAT. The lock-up clutch control signal LC in turn is supplied to the driving circuit 19, and the driving circuit 19 controls ON/OFF of the lock-up clutch of the automatic transmission in accordance with the lock-up clutch control signal LC. The throttle valve correction amount ΔTH is generated to reduce shock when the automatic transmission shifts up or shifts down, and supplied to the adder 15.

The AT controller 13 also supplies a transmission stage signal SH indicative of the set transmission stage to the driving power controller 12 (step S13).

The driving power controller 12 sets the throttle valve opening THt based on the accelerating pedal opening APcc and the transmission stage signal SH (step S14). The operation at this step S14 will be described with reference to a flow chart of FIG. 7.

Figure 7:
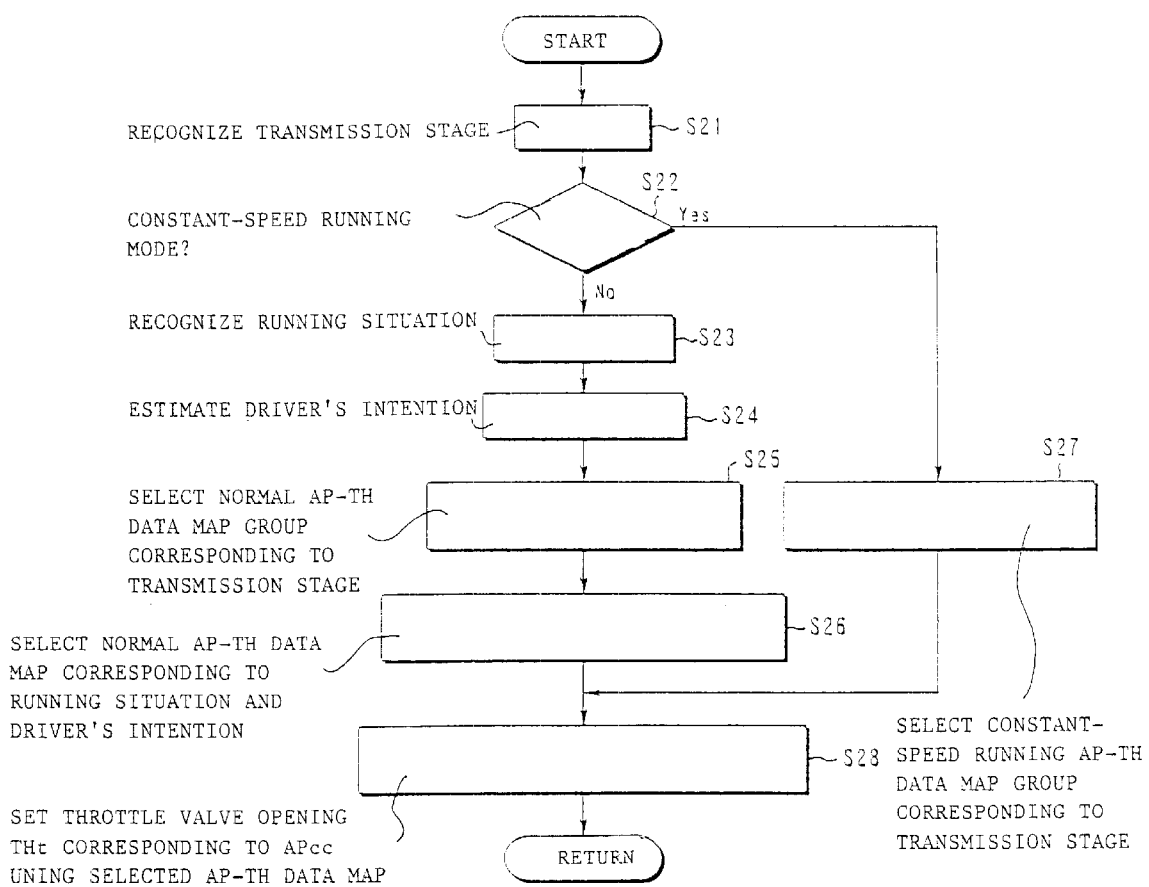
FIG. 7 is a flow chart illustrating a routine for setting a throttle valve opening THt.

The driving power controller 12 first recognizes the transmission stage from the transmission stage signal SH supplied from the AT controller 13, as illustrated in FIG. 7 (step S21). Then, it is determined whether or not the constant speed controller 11 is in the constant-speed running mode (step S22). The determination at step S22 is performed from the contents of the constant-speed running flag Fcc in a manner similar to step S1. When not in the constant-speed running mode, a running situation is recognized (step S23), and an estimation of the driver's intention is performed (step S24). At step S23, the running situation is determined, for example, from an average vehicle speed VAVE. The average vehicle speed VAVE is detected in accordance with the vehicle speed V, and a high vehicle speed and a low vehicle speed are recognized as the running situation depending on whether or not the average vehicle speed is larger than a vehicle speed threshold value. The estimation of the driver's intention at step S24 is determined, for example, from a change amount ΔAP per unit time of the accelerating pedal opening AP. Lively running and loose running are estimated as the driver's intention depending on whether or not the change amount of ΔAP is larger than an AP change amount threshold value.

Figure 8:
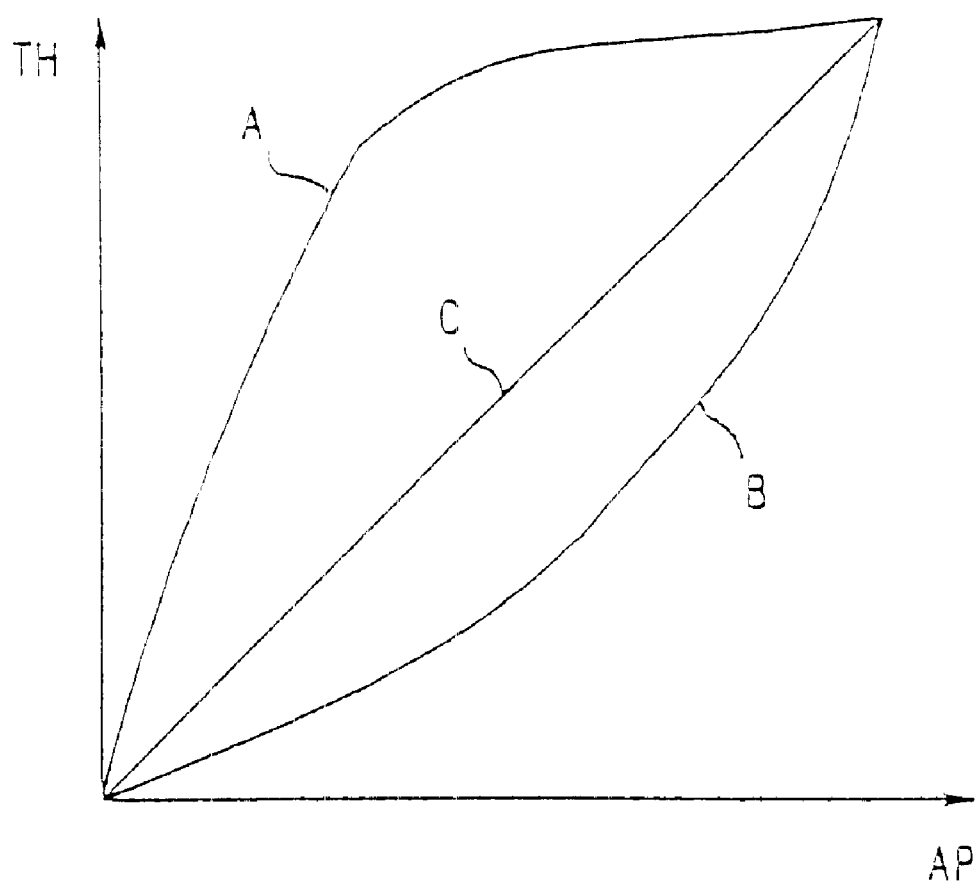
FIG. 8 is a diagram showing the AP-TH characteristic of a AP-TH data map.

After thus executing steps S23 and S24, a normal AP-TH data map group corresponding to the transmission stage recognized at step S21 is selected (step S25), and a normal AP-TH data map corresponding to the running situation recognized at step S23 and the driver's estimated intention at step S24 is further selected from the selected normal AP-TH data map group (step S26). A normal AP-TH data map group is previously stored in the memory in the driving power controller 12 for each transmission stage of the automatic transmission. For each combination of running situation and a drivers intention, there is a map provided in one normal AP-TH data map group. Therefore, after selecting a normal AP-TH data map group corresponding to a transmission stage, a normal AP-TH data map is further selected corresponding to a recognized running situation and an estimated driver's intention from among the selected normal AP-TH data map group. For example, when the running situation is a high vehicle speed and the driver's intention is for lively running, a normal AP-TH data map having an AP-TH characteristic indicated by a reference letter A in FIG. 8 is selected. On the other hand, when the running situation is a low vehicle speed and the driver's intention is for loose running, a normal AP-TH data map having an AP-TH characteristic indicated by a reference letter B in FIG. 8 is selected.

When the determination result at step S22 is the constant-speed running mode, the cruise switch 5 was operated at the driver's intention to proceed to the constant-speed running mode, so that it is not necessary to again recognize or estimate the running situation and the driver's intention. Therefore, a constant-speed running AP-TH data map is selected corresponding to the transmission stage (step S27). For example, a constant-speed running AP-TH data map having an AP-TH characteristic indicated by a reference letter C in FIG. 8 is selected.

The driving power controller 12, after executing step S26 or S27, uses the selected AP-TH data map to set the throttle valve opening Tht corresponding to the accelerating pedal opening APcc which is supplied to the adder 15 (step S28).

The adder 15 adds the throttle valve opening Tht and the throttle valve correction amount ΔTH, and supplies the addition result to the driving circuit 16 as the throttle valve opening TH (step S15). The driving circuit 16 drives the throttle valve 23 through the throttle valve actuator 17 such that the actual opening of the throttle valve 23 is equal to the throttle valve opening TH.

The operations at steps S1–S15 are repeatedly executed to control the opening of the throttle valve 23 and the transmission stage and the lock-up mechanism 22 of the automatic transmission 8 in accordance with the execution as described above.

FIG. 9 shows an example of changes in vehicle speed, running load, throttle valve opening, accelerating pedal opening and transmission stage of the automatic transmission in the constant-speed running mode in a vehicle equipped with the foregoing operation controller. In FIG. 9, as the running load increases due to a slope at a time t1 in the constant-speed running mode, the vehicle speed decreases from a target speed (wave line). In response, the increased target throttle valve opening THcc=APcc is generated from the constant-speed controller 11, and the actual opening TH of the throttle valve 23 is controlled to increase under the control of the driving power controller 12. Also, the automatic transmission is shifted down by the AT controller 13 in accordance with the target throttle valve opening THcc=APcc. In this way, the speed increases back to the target speed. After that the target throttle valve opening THcc=APcc set by the constant-speed controller 11 is reduced, so that the automatic transmission is shifted up by the AT controller 13. In this way, the follow-up characteristic to the target vehicle speed of the vehicle can be improved.

When the running load decreases at a subsequent time t2, the vehicle speed increases from the target speed, and the reduced target throttle valve opening THcc=APcc is generated from the constant-speed controller 11 in response thereto, and the actual opening TH of the throttle valve 23 is controlled to decrease under the control of the driving power controller 12. In this way, the speed decreases back to the target speed, thereby providing a favorable vehicle speed follow-up characteristic.

When the accelerator pedal is actuated by the driver for acceleration at a time t3 in the constant-speed running mode, the target throttle valve opening THcc is added to the accelerating pedal opening AP in the adder 14. Since the accelerating pedal opening APcc, which is the addition result of the adder 14, is output to the driving power controller 12, the actual opening TH of the throttle valve 23 is immediately controlled to increase under the control of the driving power controller 12 so as to act in response to the actuated accelerator pedal. Thus, the increased opening of the throttle valve 23 cause s an immediate transition to the accelerating operation, thereby making it possible to improve the drivability.

In the foregoing embodiment, the vehicle speed sensor 1 and the constant-speed controller 11 correspond to throttle valve opening detecting means. The accelerator pedal sensor 2 corresponds to accelerating pedal opening detecting means, and the adder 14 corresponds to adding means. The driving power controller 12, the adder 13 and the driving circuit 16 correspond to throttle valve driving means, and the AT controller 13 and the driving circuits 18, 19 correspond to transmission stage control means.

While in the foregoing embodiment, the constant-speed controller 11, the driving power controller 12, the AT controller 13 and the adders 14, 15 are disposed separately in the engine control unit 10, the operations thereof may be implemented by a single microcomputer.

As described above, in the constant-speed running controller of the present invention, even if the vehicle speed decreases or increases from a target vehicle speed due to a change in running load in the constant-speed running mode, a target throttle opening set by the throttle valve opening setting means in response to the change is supplied to the throttle valve driving means and to the transmission stage control means as an opening signal of the adding means, the throttle valve opening and the transmission stage of the automatic transmission are immediately adjusted to return to the target vehicle speed. Also, since an accelerating pedal opening detected by the accelerating pedal opening detecting means is added to the target throttle opening set by the throttle valve opening setting means in response to an operation on the accelerator pedal by the driver in the constant-speed running mode, and an opening signal as the addition result is supplied to the throttle valve driving means, the throttle valve opening can be increased to immediately accelerate the vehicle. It is therefore possible to improve the follow-up characteristic to the target vehicle speed and the drivability for an operation on the accelerator pedal in the constant-speed running mode.

What is claimed is:

1. A constant-speed running controller for a vehicle equipped with an engine, comprising:

an automatic transmission disposed in a driving power transmission system extending from said engine to wheels of said vehicle, having a plurality of transmission stages;

throttle valve opening setting means for setting a target throttle opening of a throttle valve such that a speed of said vehicle is at a target vehicle speed;

accelerating pedal opening detecting means for detecting an amount of accelerator pedal operation as an accelerating pedal opening;

adding means for adding the target throttle opening set by said throttle valve opening setting means and the accelerating pedal opening detected by said accelerating pedal opening detecting means to generate an opening signal as an addition result;

throttle valve driving means for driving the throttle valve based on the output opening signal of said adding means; and transmission stage control means for controlling a transmission stage of said automatic transmission in accordance with the output opening signal of said adding means.

2. A constant-speed running controller according to claim 1, wherein said transmission stage control means controls the transmission stage of said automatic transmission together with a lock-up mechanism.

3. A constant-speed running controller according to claim 1, wherein:

said transmission stage control means generates a transmission stage signal indicative of a current transmission stage of said automatic transmission; and said throttle valve driving means sets a throttle valve opening corresponding to the output opening signal of said adding means using a different data map for each transmission stage indicated by said transmission stage signal, and drives said throttle valve to have the set throttle valve opening.

* * * * *